Patented July 25, 1939

2,167,105

UNITED STATES PATENT OFFICE 2,167,105

CELLULOSIC MATERIAL AND METHOD OF MAKING SAME

Donald E. Drew, Kenmore, N. Y., assignor to E. I. du Pont de Nemours & Company, Wilmington, Del., a corporation of Delaware No Drawing. Application October 22, 1936, Serial No. 107,057

7 Claims. (Cl. 91—68)

This invention relates to improvements in smooth, non-fibrous, non-porous sheets, films and pellicles and the method of making the same. More particularly, the invention relates to the production of cellulosic pellicles, especially water sensitive films formed from aqueous alkaline cellulosic solutions, whereby to greatly enhance certain physical characteristics and consequently, their utility to manufacturer, converter and consumer. The invention will be described in terms of regenerated cellulose sheets and films although it is to be understood that this is illustrative and not limitative.

Regenerated cellulose, if manufactured in the pure form, is characterized by great brittleness and lack of flexibility. Cellulose, however, has a strong affinity for water, and even in the absence of any other softening material, will absorb a substantial amount of water from the surrounding atmosphere. If the surrounding atmosphere is of high relative humidity, such as around 95%, the water absorbed contributes sufficient softness, so that only comparatively small amounts of additional softener are necessary to make the film commercially useful. In order, however, to make the film flexible and non-brittle at all humidities, a substantial amount of a relatively non-volatile hygroscopic softener, such as glycerin, is customarily impregnated into the film. When this is done, the moisture absorbed by the film at high relative humidities tends to make it more flexible than is actually necessary. However, this does no particular harm except for the fact that it very markedly increases the tendency of superimposed sheets to stick together, particularly when pressure, even though moderate, is applied. This tendency has been a problem affecting the commercial handling of the film for a great many years.

In order to overcome this difficulty, it has been proposed to apply to the surfaces of the film a thin, tenuous coating or "sizing", reducing the tendency of stacked sheets to stick together. Heretofore, most of these sizes or anti-sticking agents have been only of limited effectiveness in preventing sticking and/or are not very receptive to water soluble glues customarily used in the fabrication of packages or the like and/or have a tendency, when applied in too large quantities, of causing haze or blush in the film.

It is therefore an object of this invention to produce thin, non-fibrous, substantially non-porous sheets and films of improved resistance to sticking together and at the same time with little or no impairment of glue receptivity and a minimum amount of haze or blush.

It is a further object to produce such sheets or films having an improved resistance to sticking together in atmospheres of high relative humidity and/or when impregnated with large quantities of a softening agent.

It is a still further object to produce such sheets or films of regenerated cellulose or other water sensitive cellulosic materials.

It is a still further object to produce new sizing materials for such sheets and films.

Other objects will appear hereinafter.

The objects of this invention are in general accomplished by sizing such sheets or films with a salt of low water solubility.

According to the preferred form of this invention, these sizing or anti-sticking agents are applied to transparent regenerated cellulose sheets while such sheets are in the gel state. Preferably this is accomplished by passing the gel regenerated cellulose in continuous form through a bath containing the sizing or anti-sticking agent in the desired concentration. This is most conveniently done just prior to the drying operation and at the same time as impregnation with a softener, such as glycerin. Before entering the drier, the excess anti-sticking agent, together with the excess softener solution, may be removed by suitable squeeze rollers, scraper rods, doctor knives, or the like. The amount of anti-sticking agent which is applied is controlled by adjusting the concentration of the anti-sticking agent in the treating bath, or by varying the amount of excess removed. If it is desired to apply the anti-sticking agent separately, the pellicle may be treated with a softener bath, the excess removed as indicated above and then the solution or dispersion of anti-sticking agent applied by dip rolls, sprays, or the like. The invention is also applicable to the production of film containing no softener, such softener free film being used for certain special purposes.

In general, the salts which are applicable in the practice of this invention are inorganic and organic salts soluble in water (at 25° C.) within the range 0.03% and 5.00%, and preferably within the range 0.1% to 1.5%. Salts which are not soluble to the amount of 0.03% (and preferably 0.1%) will not be present in sufficient quantity to impart sticking resistance to the film. On the other hand, small quantities of salts which are soluble to a greater extent than 5% (and preferably 1.5%) will not exhibit the localized surface effects necessary for imparting sticking resistance. If enough highly soluble salt is present to give the desired surface effect, so much material will be dispersed throughout the film that it will tend to crystallize, thus embrittling the film and causing it to become opaque or translucent.

This invention is not concerned with the use of emulsions or suspensions of inorganic or organic materials having a lower water solubility than 0.03% (at 25° C.), even though the concentration be above this limit, such as by means of a dispersion. It is, however, intended to include those salts which come within these solubility ranges and in which an additional amount of salt may be present in colloidal dispersion, formed for example by double decomposition in situ. Additionally, it is intended to cover those salts which may be brought within the desired solubility range by the addition of an acid, alkali or salt. It is also intended to cover those substances, which, although not salts, such as lithium hydroxide, tend to form insoluble or slightly soluble salts by reaction with materials in the air, such as carbon dioxide.

Preferably only very minute quantities of anti-sticking substances are applied to the transparent regenerated cellulose pellicle, which substances, after drying in the pellicle, will usually and preferably amount to less than 2% of the product and may even amount to as little as a few hundredths per cent.

In carrying out the sizing treatment it is essential that the solution be so prepared, that the quantity be so controlled and that drying be so carried out that the final product is substantially not inferior to similar unsized products, particularly in the retention of transparency and brilliance and receptiveness to the usual aqueous adhesive. Furthermore, the product should resist cohesion, such as caking of stacked sheets when stored under pressure and/or exposed to atmospheres of high humidity as much or more than similar unsized sheets even though the product may contain as much as twice the quantity of softening agent as the unsized product. For this reason many restrictions are placed on the sizing or anti-sticking composition.

The salts which show the best results are those salts of lithium which are within the solubility range of this invention, particularly lithium fluoride, lithium phosphate and lithium carbonate and the halides, phosphates and carbonates of other metals which are within the solubility range of this invention. Other salts, however, which come within the solubility range of this invention are also applicable.

Of the lithium salts, lithium fluoride exhibits excellent resistance to sticking and permanent clarity of the final product. Unfortunately, its toxicity, in common with that of other fluorides, is sufficient to create a prejudice against its commercial use. For this reason, it is preferred to use lithium carbonate or lithium phosphate, which exhibit excellent resistance to sticking and have such a slight tendency to show haze or blush as to be unobjectionable from this standpoint. Lithium carbonate can be applied from solution as such or by passing the film through a solution of lithium hydroxide which, on reaction with carbon dioxide in the air forms lithium carbonate. Lithium phosphate, the solubility of which is near the minimum within the range of this invention, can be made more soluble by the addition of weak acids such as phosphoric, hydrochloric, acetic, lactic or citric acids. Alternatively, or in combination with this procedure, additional lithium phosphate may be present in colloidal or hydrated state, for example by forming in situ by double decomposition between solutions of lithium hydroxide and phosphoric acid.

Lithium phosphate alone is very effective in preventing sheets from sticking together. This effectiveness is impaired by reducing the pH of the sizing bath to too low a value. On the other hand, at high pH values, such as are exhibited by unacidified lithium phosphate solutions, film so sized has a peculiar tendency (not possessed by most other sizes according to this invention) to show unsightly scratches when passed at high speeds over automatic wrapping machines. In order to avoid this difficulty the pH of the sizing bath is preferably kept between 7.0 and 8.0, such as by the addition of lactic or other acids, for example hydrochloric, phosphoric, acetic or citric acids.

Other alkali metal salts that have been found applicable are sodium fluoride and sodium oxalate.

Of the alkaline earth metal salts, calcium or magnesium phosphate (brought within the required solubility range by the addition of phosphoric or acetic acid) and magnesium tartrate have been found applicable. In addition, calcium, barium and strontium hydroxides have been found applicable since they form, by reaction with carbon dioxide in the air, the comparatively insoluble salts—calcium, barium and strontium carbonate respectively.

Of the salts of the heavier metals, lead chloride, silver sulfate, zinc fluoride, stannous iodide and ferrous tartrate have been found suitable.

As mentioned above, the sizing or anti-sticking agent is usually added in the required concentration to the bath containing the softener for the cellulose film. The film is then passed through this bath, preferably while in the gel state. The following examples illustrate typical compositions and methods of forming the same in accordance with this invention. In general, that concentration should be selected which accomplishes the desired degree of sticking resistance and at the same time which will not cause too great haziness or blush in the film on standing.

Example I

To a softening bath containing 7.5% glycerin in water, there is added sufficient lead chloride to make a 0.2% solution of lead chloride.

Example II

Sufficient acetic acid is added to the softening bath of Example I to dissolve 0.2% calcium hydrogen phosphate or magnesium hydrogen phosphate also added thereto.

Example III

| | Parts by weight |
|---|---|
| 9.3% aqueous solution of lithium hydroxide | 109 |
| 12.7% aqueous solution of orthophosphoric acid | 113 |
| 7.6% aqueous solution of lactic acid | 13 |
| 7.5% aqueous solution of glycerin | 9765 |
| | 10000 |

The above ingredients are thoroughly mixed together. The resulting bath is used in place of the customary bath containing a softener (glycerin) for the cellulose film. The film, preferably in the gel state, is passed through this softening bath, dried and wound up into rolls.

As has been indicated above, cellulosic pellicles of the type described which are dense, non-fibrous and substantially impermeable possess a remarkably smooth surface. Customarily such pellicles are dried by passing them in a continuous manner over a series of drier rollers, and the surface of these rolls is usually smooth so that the surface of the pellicle will not be marred during its passage thereover. As the pellicle is dried, it tends to shrink in width, and with smooth rollers the shrinkage is more or less unrestricted in the case of the usual untreated pellicle so that considerable loss in width is experienced. It might be expected therefore that a pellicle treated in accordance with the present invention to improve the sticking resistance would present a still smoother surface to the drier rollers and would result in even greater shrinkage as the pellicle is dried. It has been found, however, and surprisingly so that many of the sizing or other anti-sticking compositions within the scope of the invention are capable of preventing this shrinkage to such an extent as will result in substantially no greater loss in width than would be experienced if no sizing treatment were given. This can be done without sacrificing the improvement in sticking resistance and receptivity of the pellicle to the usual aqueous adhesives, such as one containing dextrin, calcium chloride and glycerin.

It will be seen from the foregoing that in the preparation of the product it is necessary to overcome certain obstacles which are not encountered in any other product now known. Whereas stacks of transparent regenerated cellulose sheets are readily caked or stuck together by increases in moisture or pressure, paper, being porous, less hygroscopic and relatively rough in surface, exhibits no such action. Even the glassine papers which most nearly approach transparent regenerated cellulose film are free from caking or sticking. Cohering and gluing of transparent regenerated cellulose sheets differ widely from any such problem which has been encountered in the paper field. Even the densest of papers is sufficiently porous so that a wide variety of adhesives, for example starch, casein, dextrin and gelatin agglutinants provide suitable adhesion. Plain transparent regenerated cellulose sheets, on the other hand, are smooth, non-fibrous and impervious to the usual colloidal agglutinant products and hence require specially compounded adhesives to secure proper adhesion of the smooth and substantially impermeable surface. Therefore, sizing or anti-sticking agents which would in no way affect the gluing properties of glassine paper, for example, would so prevent the wetting and adhesion of an aqueous adhesive on the surface of transparent regenerated cellulose pellicles that no useful adhesion whatsoever would result. It thus becomes apparent that the sizing or anti-sticking agents which will improve the sticking resistance of regenerated cellulose pellicles and at the same time permit the pellicles to remain receptive to aqueous adhesives which are satisfactory for use with untreated pellicles constitutes an outstanding contribution to the art. Needless to say, there are many uses to which cellulosic pellicles of the type described might be put wherein the anti-sticking characteristic is of major import while the receptivity to aqueous adhesives is of little concern. In such cases, a pellicle having improved sticking resistance, regardless of its receptivity to aqueous adhesives, will be useful, and the production of such pellicles comes well within the scope of the present invention.

Likewise, the adhesion of printing inks to surfaces of transparent, regenerated cellulose pellicles is often greatly impaired except where the gluable compositions of the present invention are employed.

Certain treatments have been developed for imparting moistureproofness and/or waterproofness to transparent regenerated cellulose sheets. While these treatments may generally be applied to highly softened sheets to produce transparent sticking-resistant products, they invariably result in products which cannot be glued with commercial aqueous adhesives. Furthermore, such processes require a second step, as of applying lacquers after the film has been dried and wound up. One very practical feature of the process of this invention is that it may be carried out at practically no increase in cost and without any alteration in the machine usually used for producing transparent regenerated cellulose sheets or in the method for subsequent handling by the manufacturer or converter or consumer.

Although this invention has been described in terms of sizing gel film, it may also be applied to film which has been dried and rewetted. However, this procedure is generally to be avoided since it necessitates an additional step in the manufacture, thus increasing the cost. It is also applicable to other smooth, non-fibrous, non-porous sheets and films which, because of their high content of softener, have a tendency to stick together, particularly water sensitive pellicles cast from aqueous or alkaline aqueous cellulosic solutions, including lowly substituted cellulose ethers, esters and ether-esters, such as glycol cellulose, methyl cellulose, ethyl cellulose, cellulose glycolic acid, and cellulose phthalic acid.

It is to be understood that all other variations or modifications which conform to the spirit of the invention are intended to be included within the scope of the claims.

I claim:

1. Transparent regenerated cellulose film containing glycerin and surface sized with lithium phosphate, obtained by the process of claim 4.

2. Transparent regenerated cellulose film containing a softener and surface sized with an anti-sticking agent, obtained by the process of claim 6.

3. Transparent regenerated cellulose film containing a softener and surface sized with an anti-sticking agent, obtained by the process of claim 5.

4. In the method of forming transparent regenerated celulose film, the step which comprises treating said film with an aqueous solution of glycerin and lithium phosphate, the pH of the solution being between 7.0 and 8.0.

5. The process which comprises applying to a cast from an aqueous cellulosic solution, an aqueous solution of softener and an anti-sticking agent from the class consisting of lithium fluoride, lithium hydroxide, lithium phosphate, sodium fluoride, sodium oxalate, calcium phosphate, magnesium phosphate, magnesium tartrate, lead chloride, silver sulfate, zinc fluoride, stannous iodide, ferrous tartrate, calcium hydroxide, barium hydroxide and strontium hydroxide, said anti-sticking agent having a water solubility of 0.03% to 5.00% at 25° C., said anti-sticking agent being present in sufficient amount to prevent any appreciable adhesion of said films to each other and in insufficient amount to impair the transparency of said film and thereafter exposing the film to the atmosphere whereby the anti-sticking agent forms a size.

6. The method which comprises applying to a film cast from an aqueous cellulosic solution, an aqueous solution of a softener and an anti-sticking agent, said anti-sticking agent consisting of a salt having a water solubility of 0.03% to 5.00% at 25° C., said salt being present in sufficient amount to prevent any appreciable adhesion of the dry films to each other and in insufficient amount to impair the transparency of said films and thereafter exposing the film to the atmosphere whereby the anti-sticking agent forms a size.

7. The method which comprises applying to a film cast from an aqueous cellulosic solution, an aqueous solution of a softener and an anti-sticking agent, said anti-sticking agent consisting of a salt having a water solubility of 0.1% to 1.5% at 25° C., said salt being present in sufficient amount to prevent any appreciable adhesion of the dry films to each other and in insufficient amount to impair the transparency of said films and thereafter exposing the film to the atmosphere whereby the anti-sticking agent forms a size.

DONALD E. DREW.

CERTIFICATE OF CORRECTION.

Patent No. 2,167,105.     July 25, 1939.

DONALD E. DREW.

It is hereby certified that error appears in the printed specification of the above numbered patent requiring correction as follows: Page 3, second column, line 65, claim 5, before the word "cast" insert film; and that the said Letters Patent should be read with this correction therein that the same may conform to the record of the case in the Patent Office.

Signed and sealed this 19th day of September, A. D. 1939.

(Seal)      Henry Van Arsdale,
Acting Commissioner of Patents.

sticking agent being present in sufficient amount to prevent any appreciable adhesion of said films to each other and in insufficient amount to impair the transparency of said film and thereafter exposing the film to the atmosphere whereby the anti-sticking agent forms a size.

6. The method which comprises applying to a film cast from an aqueous cellulosic solution, an aqueous solution of a softener and an anti-sticking agent, said anti-sticking agent consisting of a salt having a water solubility of 0.03% to 5.00% at 25° C., said salt being present in sufficient amount to prevent any appreciable adhesion of the dry films to each other and in insufficient amount to impair the transparency of said films and thereafter exposing the film to the atmosphere whereby the anti-sticking agent forms a size.

7. The method which comprises applying to a film cast from an aqueous cellulosic solution, an aqueous solution of a softener and an anti-sticking agent, said anti-sticking agent consisting of a salt having a water solubility of 0.1% to 1.5% at 25° C., said salt being present in sufficient amount to prevent any appreciable adhesion of the dry films to each other and in insufficient amount to impair the transparency of said films and thereafter exposing the film to the atmosphere whereby the anti-sticking agent forms a size.

DONALD E. DREW.

CERTIFICATE OF CORRECTION.

Patent No. 2,167,105.                         July 25, 1939.

DONALD E. DREW.

It is hereby certified that error appears in the printed specification of the above numbered patent requiring correction as follows: Page 3, second column, line 65, claim 5, before the word "cast" insert film; and that the said Letters Patent should be read with this correction therein that the same may conform to the record of the case in the Patent Office.

Signed and sealed this 19th day of September, A. D. 1939.

(Seal)                                       Henry Van Arsdale,
Acting Commissioner of Patents.